Sept. 8, 1959 W. R. TURNER 2,903,617
ELECTRONIC ULTRASONIC IMAGE CONVERTER
Filed June 20, 1957

INVENTOR.
WILLIAM R. TURNER
BY
ATTYS.

2,903,617

ELECTRONIC ULTRASONIC IMAGE CONVERTER

William R. Turner, Chillum, Md., assignor to the United States of America as represented by the Secretary of the Navy Application June 20, 1957, Serial No. 667,056

10 Claims. (Cl. 315—12)

(Granted under Title 35, U.S. Code (1952), sec. 266)

The invention described herein may be manufactured and used by or for the Government of the United States of America for governmental purposes without the payment of any royalties theron or therefor.

The present invention relates to an electronic ultrasonic image converter. More specifically, the present invention relates to a device for utilizing ultrasonic frequencies to detect flaws in materials.

Prior attempts to utilize ultrasonic to optical conversions in the inspection of materials for defects have approached the problem from a number of different directions. Some have approached the problem by considering the direct physical effects such as the activation of a photographic emulsion, by the optical shadows, by schlieren detection of refraction, by interferometer detection of surface deformation and by the alignment of non-spherical particles such as in the Pohlman cell. Another approach has been through the chemical reactions such as the oxidation of special iodine solutions and the action of iodine on starch plates. A third approach has been through the temperature effects such as the use of chromotropic compounds or of the leucobases of dyes and the extinction of phosphorescence. A fourth group of approaches might be considered as the indirect electrical effects which utilize the detection of heat energy; ionic displacement potentials; piezoelectric conversion, such as illustrated in the Patent No. 2,164,125 to Sokoloff; and electrostrictive conversion employing a polarized ceramic plate. It is in the latter category that the present invention falls. The majority of the prior approaches to ultrasonic conversion have had difficulties in securing the high sensitivity desired and, in many instances, of requiring long periods of time for their operation. Another problem which has presented itself to workers in the field of ultrasonic to optical conversion has been the difficulty of securing detection cells having large detection surface areas coupled with sufficient mechanical strength to be useful in general applications. It has been found that the conversion utilizing a polarized electrostrictive ceramic plate, as the principle of operation, together with a low impedance electronic coupling to the output termination obtained by electron beam scanning of the electrostrictive plate through a closely spaced screen, offers the greatest sensitivity in relation to the inherent noise level and provides for a substantially instantaneous conversion from sound to a visible image. It is an object of the present invention to provide a system for converting from ultrasonic to visual energy having a high degree of sensitivity and a substantially instantaneous operation time.

Another object is to provide a conversion system having a resonance at the frequency employed in the system.

Another object of the present invention is the enhancement of sensitivity by the storage of energy in the resonant conversion system and the transfer of this stored energy to the output termination at the instant of scanning.

Another object of the present invention is to provide for impedance matching between the electronic termination of the conversion system and the medium with which the system is in contact.

Another object of the present invention is to provide a detection cell having a large structurally strong detection surface.

Other objects and advantages of the present invention will become more fully apparent from the following description and annexed drawings of which:

Figure 1:
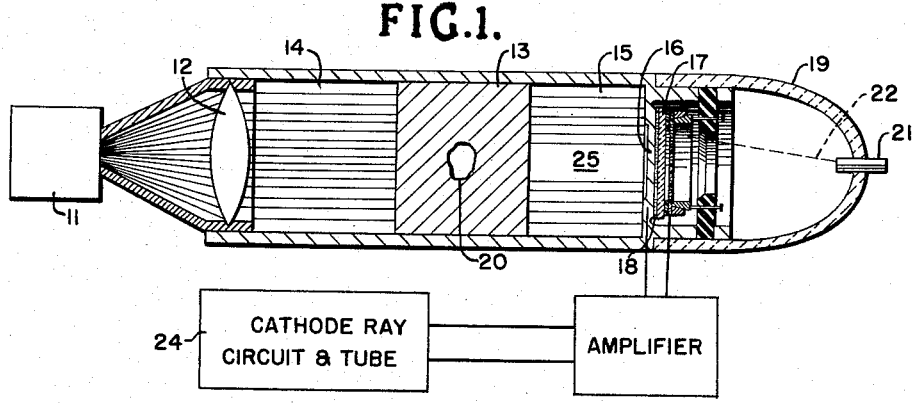
Fig. 1 is a diagrammatic view of an embodiment of the present invention.
Figure 2:
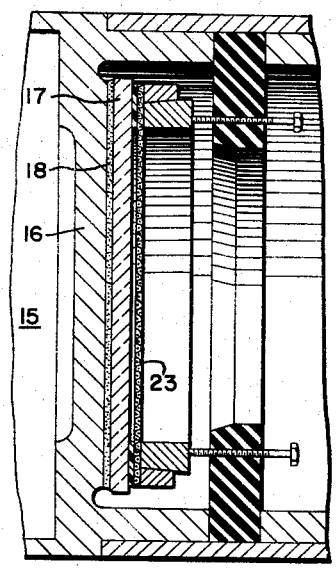
Fig. 2 is a sectional view showing the construction of the tube head.

Referring now to the drawing wherein like reference characters designate like or corresponding parts through the several views, there is shown in Fig. 1 a source of ultrasonic vibrations 11 whose radiated vibrations are collimated by an acoustical lens 12 and passed through a coupling medium 14 into a specimen 13. The ultrasonic vibrations after passing through the specimen 13 are passed through a coupling medium 15 to a detecting device of the present invention. This detection device comprises a supporting plate 16 which is bonded to a layer of polarized electrostrictive material 17 by a suitable bonding material 18 and which is mounted as an end face for a vacuum tube 19. By way of example the plate 16 may be metal and the material of layer 17 may be polarized $BaTiO_3$. The vacuum tube 19 has an electron gun 21 which emits a beam of electrons 22. In the detection tube 19 there is mounted a screen 23, closely spaced to the surface of layer 17. The beam of electrons 22 is made to pass through this screen and to scan the surface of the layer 17 by a conventional mechanism (not shown), and to produce from the surface of layer 17 an emission of secondary electrons. The ratio of secondary emitted to primary electrons exceeds unity for most insulators, including $BaTiO_3$. Since layer 17 consists of an insulator exhibiting a secondary emission ratio greater than unity, a space charge forms in front of the surface and this space charge limits the flow of secondary emission to screen 23 and reflects the remaining emission back to the surface. Also, the electrical potential of the insulated surface of layer 17 with respect to screen 23 falls until an equilibrium is established such that the space charge limited secondary electron emission reaching screen 23 equals the primary beam current impinging upon the surface of layer 17. The displacement of the electric charge on layer 17 produced by the ultrasonic vibrations impinging upon the surface of plate 16 changes the surface potential alternately at the frequency of the vibrations. At the point on the surface of layer 17 being scanned by the electron beam 22, the alternating surface potential modulates the space charge controlled secondary emission current flowing to screen 23. Thereby, the converted ultrasonic signal is electronically coupled to screen 23, and thence to the output termination over an impedance path produced by electron beam 22. After suitable amplification and rectification, this signal is applied to modulate the intensity of a cathode ray tube 24 having its scan synchronized with the scan of electron gun 21, and thus to produce a visual image of the ultrasonic wave generated by the source of ultrasonic vibrations 11 and impinging upon the surface of element 16.

In the construction of the detection tube 19, the metallic plate 16 and the layer 17 are made to form a resonant device at the frequency emitted from source 11. This may be accomplished by having the plate 16 and layer 17 each of a thickness of one quarter of the wave length of the particular frequency in its respective material.

Thus the thickness of the metallic plate and the thickness of the layer 17, while each a quarter wave length in thickness would not necesarily be of the same thickness. Alternatively, the thickness of plate 16 may be odd multiples of one quarter wave in thickness, thus permitting achievement of a structurally strong detection surface. The making of the detecting device, or conversion system, resonant at the frequency emitted by source 11 produces a system having a high efficiency of operation. A further improvement in the conversion efficiency is achieved by providing an impedance match between the medium 15, and the electrical output termination. The coupling impedance formed by electron beam 22 between the surface of layer 17 and screen 23 is adjusted by the spacing between the screen and the surface, the diameter of the electron beam, and its current density. The impedance match between medium 15 and the total electrical termination consisting of the scanning beam impedance in series with the termination impedance is achieved by adjusting the thicknesses of plate 16 and the layer 17 in accordance with formulas relating these thicknesses to the impedances of the respective materials. These formulas have been reported in the literature in various forms, the most explicit being by Cady, Journal of the Acoustic Society of America, v. 22, pp. 579–83. For example, in determining the cross sectional area of the scanning beam, a large beam will give a large signal current but will produce poor resolution. The resolution is limited by diffraction in the lens system to about one half the wave length of the sound in the medium. Therefore, the smallest practical cross section of the beam is about one half the wave length in diameter. In bonding the metallic plate to the layer 17 it is necessary that there be an intimate bond over the entire surface therebetween such that no variations in the bonding thickness nor any voids exist between the two surface materials.

In operation the source 11 emits a sound signal of ultrasonic frequency, for example from 1 to 30 megacycles per second, directed onto an acoustic lens 12 which collimates the waves of the ultrasonic energy emitted from the source 11 and passes them through a coupling medium 14 to the specimen 13 as substantially plane waves. When these plane waves pass through a specimen having a flaw such as the flaw 20 illustrated, Fig. 1, the flaw produces discontinuities and distortions in the wave front of the plane waves which travel out of the specimen into the coupling medium 15 and impinge upon the metallic plate 16 of the detection tube 19, these discontinuities and distortions being shown generally at 25. This distorted wave impinging upon the detection surface 16 produces in the polarized electrostrictive materials of layer 17 electrical charges proportional to the point-by-point intensity of the impinging wave front. Since as stated in the foregoing description of the device, the elements 16 and 17 are designed to be resonant with the frequency of the sound signal employed, the resonance of these elements permits a storage of energy therein which is transferred to screen 23 at the instant of scanning over the impedance path established by the space charge controlled secondary emission, providing that the termination impedance is small compared to the impedance of the medium 15 as transformed and converted to its electrical equivalent by plate 16 and conversion element 17. As the surface of layer 17 is scanned by the beam 22 the potential between the screen 23 and the layer 17 is reduced thus causing a rapid reduction in the energy level of the resonant system at the instantaneous point of scan. Since the point-by-point energy level in the material of layer 17 is determined by the instant radiation which has passed through the specimen 13 and which has been modified by the effects of the flaw 20 therein, the amounts of energy released in this scanning process will vary from point to point according to the non-homogeneities present in the specimen 13. These variations now can be displayed on a cathode ray screen indicated at 24 to give an amplified picture of the flaw or flaws present in the specimen 13.

Figure 3:
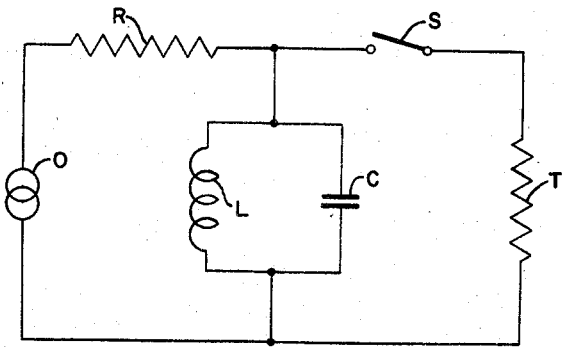
Fig. 3 is an analogus electrical circuit.

These effects are illustrated by the electrical analogy of Fig. 3 wherein an oscillator O provides an electrical frequency source corresponding to the ultrasonic sound source of the mechanical embodiment of the invention, a resistance R corresponding to the radiation impedance of the system, the inductance L and capacitance C in the resonant circuit corresponding respectively to the compliance and the mass of the system, the closing of switch S corresponding to the contact of the scanning beam with an elemental area of the layer 17, and the resistance T corresponding to the terminal impedance of the system.

Figure 4:
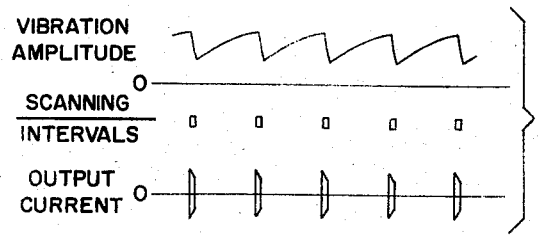
Fig. 4 is a graph showing the relation of energy with time.

The graph of Fig. 4 illustrates how the energy is accumulated during the interval between the scan of an individual element of the surface of the layer of polarized electrostrictive material 17 and released by the scanning beam at the time the beam touches the element.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An acoustical-electrical conversion device comprising a tube having a vacuum, an electron gun mounted in one end of said tube, a sound conversion member mounted in the opposite end of said tube and forming the external surface thereof, said member comprising a supporting plate and a layer of polarized electrostrictive material bonded to said supporting plate and disposed within said tube for receiving ultrasonic sound vibrations and changing its surface potential alternately at the frequency thereof, an electrically conductive secondary pickup screen mounted in said tube adjacent said member, said electron gun being directed to produce an electron beam that scans said layer through said screen and effects an emission of secondary electrons, said member being resonant at the frequency which it is desired to convert sonic energy to electrical energy, and outputs connected to said screen and supporting plates respectively.

2. A device as claimed in claim 1 in which the acoustical impedance of said member matches the acoustical impedance of the medium in contact with its external surface.

3. A device as claimed in claim 2 in which the thicknesses of said supporting plate and the polarized electrostrictive layer match the impedance of the electrical termination of said member to the acoustical impedance of the acoustical transmitting medium in contact with the supporting plate.

4. A device as claimed in claim 3 in which said impedance match is optimized by adjusting the cross sectional area of the electron beam.

5. A device as claimed in claim 4 in which said impedance match is optimized by adjusting the current density of said electron beam.

6. A device as claimed in claim 1 in which the coupling impedance between said screen and said electrostrictive layer is dependent upon the spacing of said screen from said electrostrictive layer.

7. A device as claimed in claim 2 in which said supporting plate has a thickness of an odd quarter wave length of the frequency of the sound in the material of which the plate is composed and the polarized electrostrictive layer has a thickness of an odd quarter of the wave length of the sound in the polarized electrostrictive material, thereby to produce a resonant system at the desired frequency.

8. A device as claimed in claim 1 in which said electrostrictive material is barium titanate.

9. An acoustical-electrical conversion device comprising a tube having a vacuum, an electron gun mounted in one end of said tube, a conversion member mounted in the opposite end of said tube and forming the external surface thereof, said member comprising a supporting plate and a layer of polarized electrostrictive material bonded to said supporting plate and disposed within said tube, an electrically conductive secondary pickup screen mounted in said tube adjacent said member, said electron gun being directed to produce an electron beam that scans said member through said screen whereby secondary electrons are caused to impinge said screen selectively in accordance with the instantaneous voltage of said layer of polarized electrostrictive material, and an output connected to said screen and supporting plate respectively.

10. An acoustic-electrical conversion device according to claim 1 in which the electron beam is employed to transfer a portion of the energy stored in said resonant member to the screen during each scanning operation thereby to increase the sensitivity of said device.

References Cited in the file of this patent

UNITED STATES PATENTS

| | | |
|---|---|---|
| 2,164,125 | Sokoloff | June 27, 1939 |
| 2,528,726 | Rines | Nov. 7, 1950 |
| 2,793,288 | Pulvari | May 21, 1957 |